US009175749B2

(12) United States Patent
Noh et al.

(10) Patent No.: US 9,175,749 B2
(45) Date of Patent: Nov. 3, 2015

(54) PLANETARY GEAR TRAIN OF AUTOMATIC TRANSMISSION FOR VEHICLES

(71) Applicant: Hyundai Motor Company, Seoul (KR)

(72) Inventors: Myeong Hoon Noh, Seongnami-si (KR); Chang Wook Lee, Suwon-si (KR); Kangsoo Seo, Yongin-si (KR); Seong Wook Hwang, Gunpo-si (KR); Jongsool Park, Hwaseong-si (KR); Jae Chang Kook, Hwaseong-si (KR); Seongwook Ji, Ansan-si (KR); Wonmin Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/542,337

(22) Filed: Nov. 14, 2014

(65) Prior Publication Data

US 2015/0167791 A1 Jun. 18, 2015

(30) Foreign Application Priority Data

Dec. 18, 2013 (KR) .......................... 10-2013-0158808

(51) Int. Cl.
*F16H 3/62* (2006.01)

(52) U.S. Cl.
CPC ............ *F16H 3/62* (2013.01); *F16H 2200/006* (2013.01); *F16H 2200/0082* (2013.01); *F16H 2200/201* (2013.01); *F16H 2200/2043* (2013.01)

(58) Field of Classification Search
CPC ..... F16H 3/62; F16H 2003/442; F16H 37/04; F16H 37/042; F16H 2200/006; F16H 2200/201; F16H 2200/2043
See application file for complete search history.

(56) References Cited

U.S. PATENT DOCUMENTS

| 8,047,957 B2* | 11/2011 | Phillips et al. ................. 475/302 |
| 8,083,633 B2* | 12/2011 | Wittkopp et al. .............. 475/296 |
| 8,100,801 B2 | 1/2012 | Wittkopp et al. |
| 8,617,023 B1* | 12/2013 | Noh et al. ...................... 475/311 |
| 2010/0248883 A1* | 9/2010 | Wittkopp et al. ................. 475/5 |

FOREIGN PATENT DOCUMENTS

JP 2010-007709 A 1/2010

* cited by examiner

*Primary Examiner* — Huan Le
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft disposed in parallel with the input shaft, a first planetary gear set including a first sun gear, a first planet carrier, and a first ring gear, a second planetary gear set including a second sun gear, a second planet carrier, and a second ring gear, and a third planetary gear set including a third sun gear, a third planet carrier, and a third ring gear. The planetary gear train may further include first, second, third and fourth clutches and a first brake.

9 Claims, 11 Drawing Sheets

FIG. 2

|  | C1 | C2 | C3 | C4 | B1 | gear ratio |
|---|---|---|---|---|---|---|
| 1ST | ● | ● |  |  | ● | 4.714 |
| 2ND | ● |  |  | ● | ● | 3.027 |
| 3RD | ● | ● |  | ● |  | 1.979 |
| 4TH | ● |  | ● | ● |  | 1.604 |
| 5TH | ● | ● | ● |  |  | 1.257 |
| 6TH |  | ● | ● | ● |  | 1.000 |
| 7TH |  | ● | ● |  | ● | 0.829 |
| 8TH |  |  | ● | ● | ● | 0.642 |
| REV | ● |  | ● |  | ● | -3.413 |

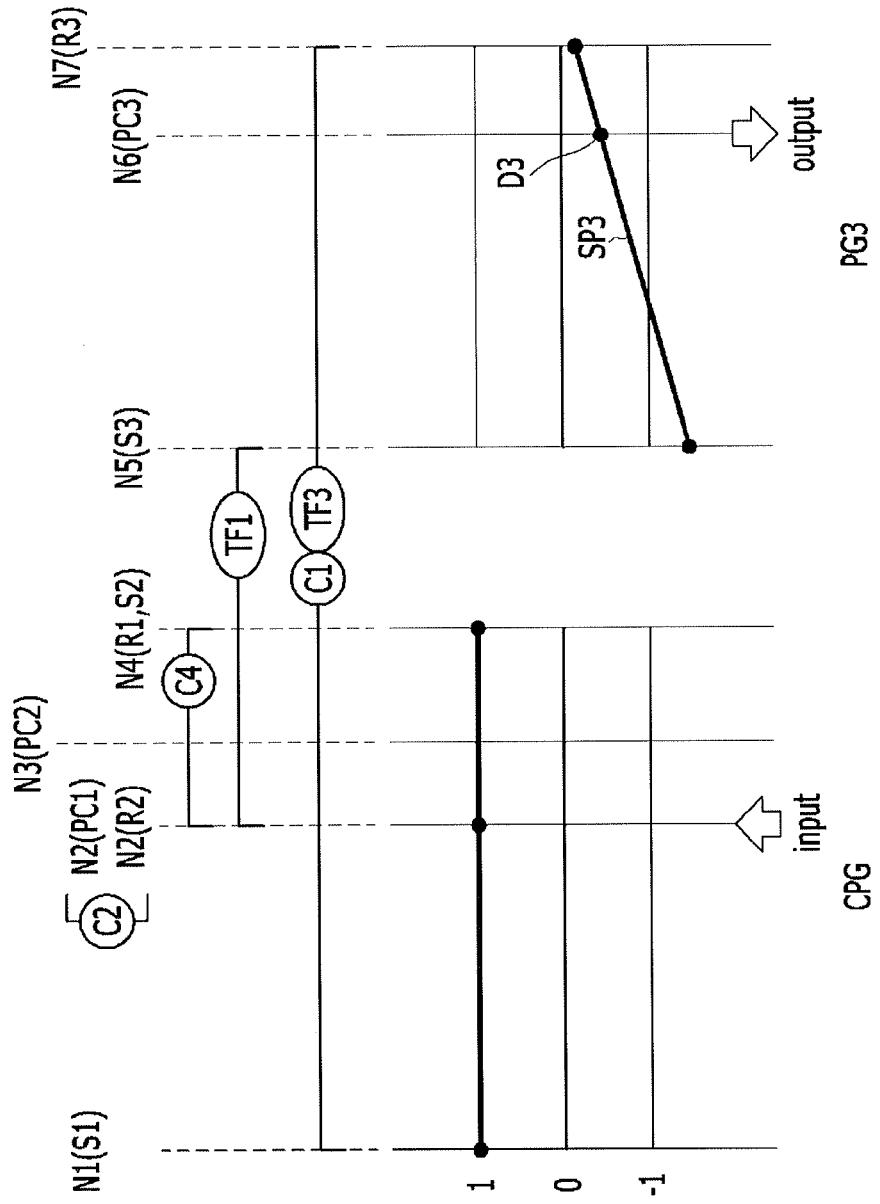

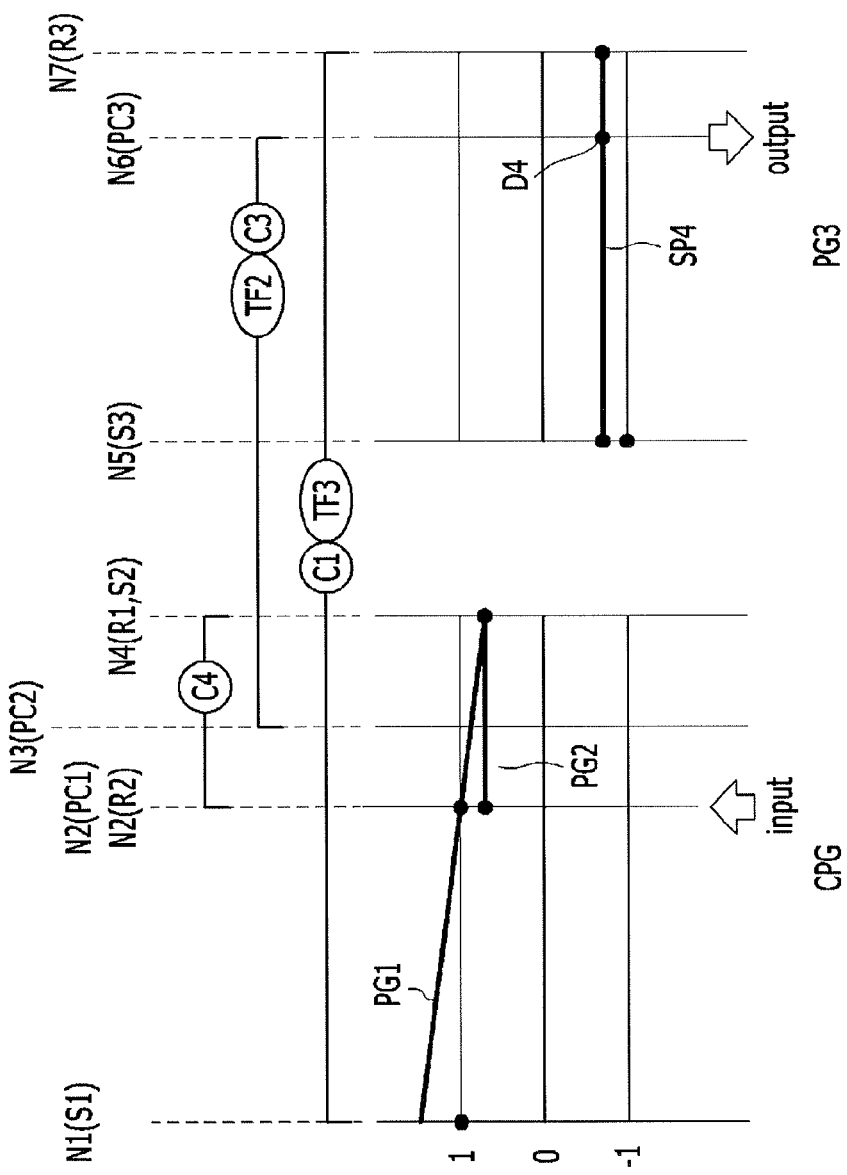

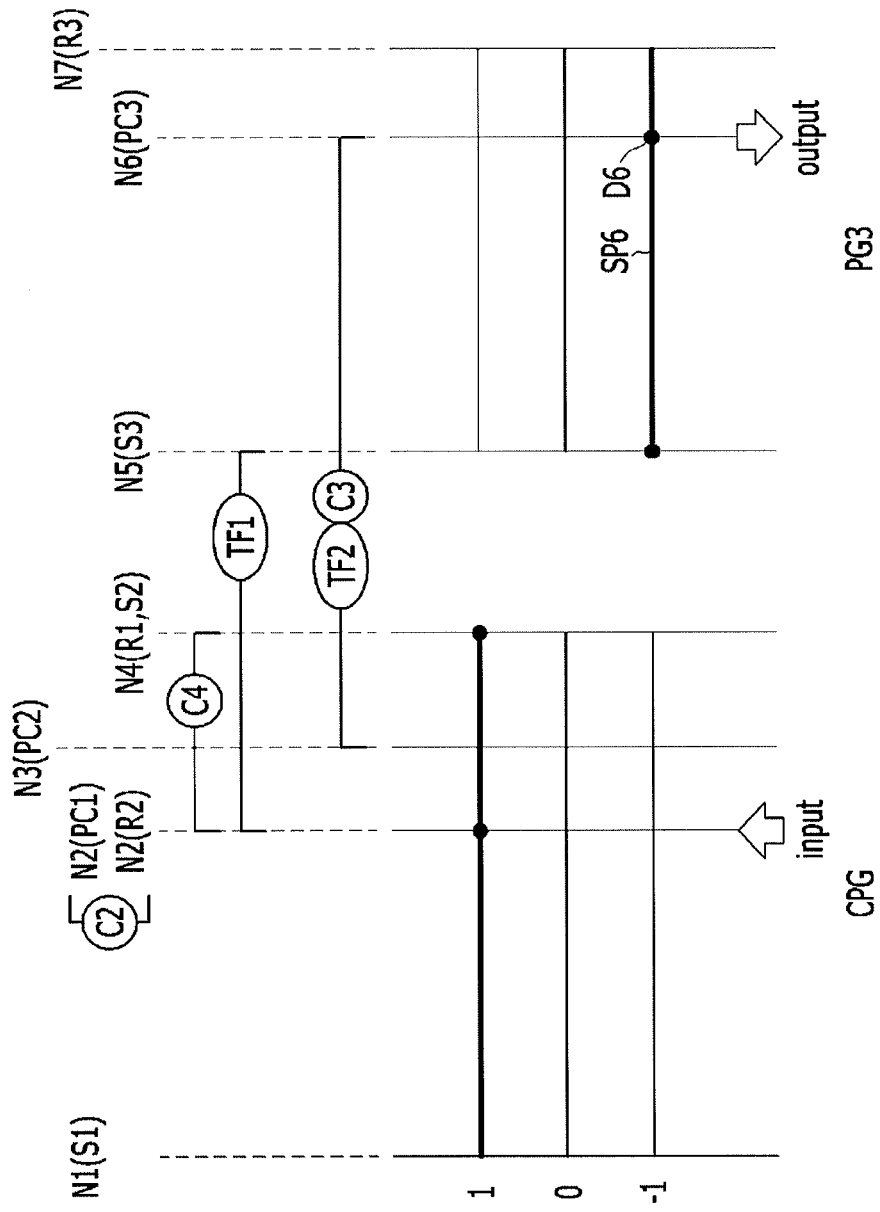

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2013-0158808 filed on Dec. 18, 2013, the entire contents of which application are incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such as durability, power delivery efficiency, and size which depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control. In addition, a step ratio between the neighboring shift-speeds should be controlled to be suitable according to the planetary gear train.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a planetary gear train of an automatic transmission for a vehicle having advantages of improving mountability by shortening a length thereof and reducing fuel consumption by improving power delivery performance as a consequence of achieving eight forward speeds and one reverse speed having excellent operating condition of frictional elements by combining three planetary gear sets separately disposed on an input shaft and an output shaft, three planetary gear set, three transfer gears, and five frictional elements.

In addition, the present invention has been made in an effort to provide a planetary gear train of an automatic transmission for a vehicle having further advantages of enabling of setting optimum gear ratios due to ease of changing gear ratios by using three transfer gears, and accordingly improving power delivery performance and fuel economy at a low-speed driving.

A planetary gear train of an automatic transmission for a vehicle according to various aspects of the present invention may include: an input shaft receiving torque of an engine; an output shaft disposed in parallel with the input shaft; a first planetary gear set including a first sun gear, a first planet carrier, and a first ring gear as rotation elements thereof; a second planetary gear set including a second sun gear, a second planet carrier, and a second ring gear as rotation elements thereof; and a third planetary gear set including a third sun gear, a third planet carrier, and a third ring gear as rotation elements thereof; wherein a first rotation element being one rotation element of the first planetary gear set and selectively connected to a transmission housing; a second rotation element being another rotation element of the first planetary gear set, directly connected to the input shaft, and selectively connected to one rotation element of the second planetary gear set; a third rotation element being another rotation element of the second planetary gear set; a fourth rotation element being the remaining rotation element of the first planetary gear set and the remaining rotation element of the second planetary gear set directly connected to each other; a fifth rotation element being one rotation element of the third planetary gear set, connected to the one rotation element of the second planetary gear set through a first transfer gear, and selectively connected to the input shaft through the first transfer gear; a sixth rotation element being another rotation element of the third planetary gear set, directly connected to the output shaft, and selectively connected to the third rotation element through a second transfer gear; and a seventh rotation element being the remaining rotation element of the third planetary gear set and selectively connected to the first rotation element through a third transfer gear.

Each of the first, second, and third planetary gear sets may be a single pinion planetary gear set.

The first rotation element may be the first sun gear, the second rotation element may be the first planet carrier or the first planet carrier and the second ring gear, the third rotation element may be the second planet carrier, the fourth rotation element may be the first ring gear and the second sun gear, the fifth rotation element may be the third sun gear, the sixth rotation element may be the third planet carrier, and the seventh rotation element may be the third ring gear.

The planetary gear train may further include: a first clutch disposed between the first rotation element and the third transfer gear; a second clutch disposed between the input shaft and the first transfer gear; a third clutch disposed between the sixth rotation element and the second transfer gear; a fourth clutch configured to directly couple the second planetary gear set; and a first brake disposed between the first rotation element and the transmission housing.

The first and second clutches and the first brake may be operated at a first forward speed, the first and fourth clutches and the first brake may be operated at a second forward speed, the first, second, and fourth clutches may be operated at a third forward speed, the first, third, and fourth clutches may be operated at a fourth forward speed, the first, second, and third clutches may be operated at a fifth forward speed, the second, third, and fourth clutches ma be operated at a sixth forward speed, the second and third clutches and the first brake may be operated at a seventh forward speed, the third and fourth clutches and the first brake may be operated at an eighth forward speed, and the first and third clutches and the first brake may be operated at a reverse speed.

A planetary gear train of an automatic transmission for a vehicle according to various other aspects of the present invention may include: an input shaft receiving torque of an engine; an output shaft disposed in parallel with the input shaft; a first planetary gear set including a first sun gear, a first planet carrier, and a first ring gear as rotation elements thereof; a second planetary gear set including a second sun gear, a second planet carrier, and a second ring gear as rotation elements thereof; and a third planetary gear set including a third sun gear, a third planet carrier, and a third ring gear as rotation elements thereof; wherein a first rotation element being the first sun gear and selectively connected to a transmission housing; a second rotation element being the first planet carrier and/or the second ring gear selectively connected to the first planet carrier, and directly connected to the input shaft; a third rotation element being the second planet carrier; a fourth rotation element being the first ring gear and the first sun gear directly connected to each other and selectively connected to the second ring gear; a fifth rotation element being the third sun gear, selectively connected to the input shaft through a first transfer gear, and connected to the second ring gear through the first transfer gear; a sixth rotation element being the third planet carrier, directly connected to the output shaft, and selectively connected to the third rotation element through a second transfer gear; and a seventh rotation element being the third ring gear and selectively connected to the first rotation element through a third transfer gear.

Each of the first, second, and third planetary gear sets may be a single pinion planetary gear set.

The planetary gear train may further include: a first clutch disposed between the first rotation element and the third transfer gear; a second clutch disposed between the input shaft and the first transfer gear; a third clutch disposed between the sixth rotation element and the second transfer gear; a fourth clutch configured to directly couple the second planetary gear set; and a first brake disposed between the first rotation element and the transmission housing.

The first and second clutches and the first brake may be operated at a first forward speed, the first and fourth clutches and the first brake may be operated at a second forward speed, the first, second, and fourth clutches may be operated at a third forward speed, the first, third, and fourth clutches may be operated at a fourth forward speed, the first, second, and third clutches may be operated at a fifth forward speed, the second, third, and fourth clutches ma be operated at a sixth forward speed, the second and third clutches and the first brake may be operated at a seventh forward speed, the third and fourth clutches and the first brake may be operated at an eighth forward speed, and the first and third clutches and the first brake may be operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

FIG. 3C is a lever diagram of an exemplary planetary gear train at the third forward speed according to the present invention.

FIG. 3D is a lever diagram of an exemplary planetary gear train at the fourth forward speed according to the present invention.

FIG. 3F is a lever diagram of an exemplary planetary gear train at the sixth forward speed according to the present invention.

DETAILED DESCRIPTION

Figure 1:
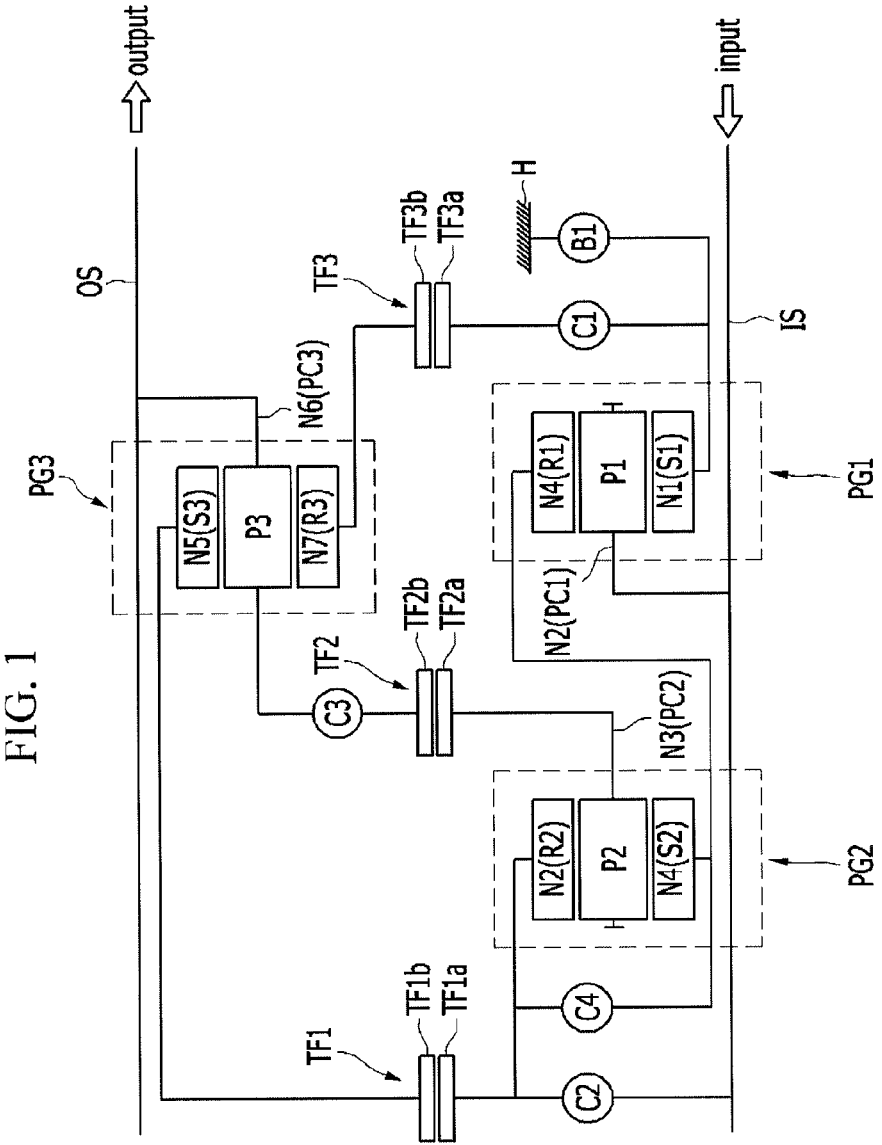
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a planetary gear train according to various embodiments of the present invention. Referring to FIG. 1, a planetary gear train according to various embodiments of the present invention includes first, second, and third planetary gear sets PG1, PG2, and PG3, five frictional elements B1, C1, C2, C3, and C4, and three transfer gears TF1, TF2, and TF3.

The first and second planetary gear sets PG1 and PG2 are disposed on the input shaft IS, and the third planetary gear set PG3 is disposed on the output shaft OS disposed in parallel or substantially in parallel with and apart from the input shaft IS.

Therefore, the torque input from the input shaft IS is changed into eight forward speeds and one reverse speed by cooperation of the first, second, and third planetary gear sets PG1, PG2, and PG3, and is then output through the output shaft OS.

The first planetary gear set PG1 is a single pinion planetary gear set, and has a first sun gear S1, a first ring gear R1, and a first planet carrier PC1 rotatably supporting a first pinion P1 engaged with the first sun gear S1 and the first ring gear R1 as rotation elements thereof.

The second planetary gear set PG2 is a single pinion planetary gear set, and has a second sun gear S2, a second ring gear R2, and a second planet carrier PC2 supporting a second pinion P2 engaged with the second sun gear S2 and the second ring gear R2 are rotation elements thereof.

The third planetary gear set PG3 is a single pinion planetary gear set, and has a third sun gear S3, a third ring gear R3, and a third planet carrier PC3 rotatably supporting a third pinion P3 engaged with the third sun gear S3 and the third ring gear R3 as rotation elements thereof.

The first and second planetary gear set PG1 and PG2 are operated as a compound planetary gear set and the third planetary gear set PG3 is operated as a simple planetary gear train.

The first ring gear R1 and the second sun gear S2 are directly connected to each other, and the first planet carrier PC1 and the second ring gear R2 are selectively connected to each other such that the first and second planetary gear sets PG1 and PG2 have four rotation elements N1, N2, N3, and N4.

The first rotation element N1 is the first sun gear S1, is selectively connected to the transmission housing H so as to be operated as a selective fixed element, and is operated as a selective output element.

The second rotation element N2 is the first planet carrier PC1 and the second ring gear R2 or the second ring gear R2, and is directly or selectively connected to the input shaft IS so as to be operated as an input element.

The third rotation element N3 is the second planet carrier PC2 and is operated as an output element.

The fourth rotation element N4 is the first ring gear R1 and the second sun gear S2.

In addition, the third planetary gear set PG3 has three rotation elements N5, N6, and N7, converts torque transmitted from the input shaft IS and the first and second planetary gear sets PG1 and PG2, and transmits the coverted torque to the output shaft OS.

The fifth rotation element N5 is the third sun gear S3 and is selectively connected to the input shaft IS through an externally-meshed gear or is connected to the second planetary gear set PG2 through the externally-meshed gear.

The sixth rotation element N6 is the third planet carrier PC3, is directly connected to the output shaft OS, and is selectively connected to the third rotation element PC2 through an externally-meshed gear.

The seventh rotation element N7 is the third ring gear R3 and is selectively connected to the first rotation element N1 through an externally-meshed gear In addition, the rotation elements are combined or connected by the first, second, and third transfer gears TF1, TF2, and TF3 and frictional elements including the first brake B1 and the first, second, third, and fourth clutches C1, C2, C3, and C4.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 includes a first transfer drive gear TF1a selectively connected to the second ring gear R2 directly connected to the input shaft IS and a first transfer driven gear TF1b directly connected to the fifth rotation element N5. The first transfer gear TF1 selectively connects the fifth rotation element N5 to the input shaft IS or directly connects the fifth rotation element N5 to the second rotation element N2.

The second transfer gear TF2 includes a second transfer drive gear TF2a directly connected to the third rotation element N3 and a second transfer driven gear TF2b selectively connected to the sixth rotation element N6. The second transfer gear TF2 selectively connects the third rotation element N3 to the sixth rotation element N6.

The third transfer gear TF3 includes a third transfer drive gear TF3a selectively connected to the first rotation element N1 and a third transfer driven gear TF3b directly connected to the seventh rotation element N7. The third transfer gear TF3 selectively connects the first rotation element N1 to the seventh rotation element N7.

Therefore, the rotation elements connected to each other by the first, second, and third transfer gears TF1, TF2, and TF3 are rotated in opposite direction to each other. Gear ratios of the first, second, and third transfer gears TF1, TF2, and TF3 are set according to speed ratios demanded at shift-speeds.

Arrangements of the frictional elements B1, C1, C2, C3, and C4 will be described in detail.

The first brake B1 is disposed between the first rotation element N1 and the transmission housing H. The first clutch C1 is disposed between the third transfer gear TF3 and the first rotation element N1. The second clutch C2 is disposed between the first transfer gear TF1 and the input shaft IS. The third clutch C3 is disposed between the second transfer gear TF2 and the sixth rotation element N6. The fourth clutch C4 is disposed between the fourth rotation element N4 and the first transfer gear TF1.

The frictional elements including the first, second, third, and fourth clutches C1, C2, C3, and C4 and the first brake B1 may be the same or similar to conventional multi-plate friction elements of wet type that are operated by hydraulic pressure.

FIG. 2 is an operational chart of friction members at each shift-speed applied to a planetary gear train according to various embodiments of the present invention. As shown in FIG. 2, three frictional elements are operated at each shift-speed in the planetary gear train according to various embodiments of the present invention.

The first and second clutches C1 and C2 and the first brake B1 are operated at a first forward speed 1ST. The first and fourth clutches C1 and C4 and the first brake B1 are operated at a second forward speed 2ND. The first, second, and fourth clutches C1, C2, and C4 are operated at a third forward speed 3RD. The first, third, and fourth clutches C1, C3, and C4 are operated at a fourth forward speed 4TH. The first, second, and third clutches C1, C2, and C3 are operated at a fifth forward speed 5TH. The second, third, and fourth clutches C2, C3, and C4 are operated at a sixth forward speed 6TH. The second and third clutches C2 and C3 and the first brake B1 are operated at a seventh forward speed 7TH. The third and fourth clutches C3 and C4 and the first brake B1 are operated at an eighth forward speed 8TH. The first and third clutches C1 and C3 and the first brake B1 are operated at a reverse speed REV.

FIG. 3A to FIG. 3I are lever diagrams of the planetary gear train at each shift-speed according to various embodiments of the present invention, and illustrate shift processes of the planetary gear train according to various embodiments of the present invention by lever analysis method.

Referring to FIG. 3A to FIG. 3I, four vertical lines of the compound planetary gear set CPG formed by the first and second planetary gear sets PG1 and PG1 are set as the first rotation element N1, the second rotation element N2, the third rotation element N3, and the fourth rotation element N4, and three vertical lines of the third planetary gear set PG3 are set as the fifth rotation element N5, the sixth rotation element N6, and the seventh rotation element N7 from the left to the right.

In addition, a middle horizontal line represents a rotation speed of "0", an upper horizontal line represents a rotation speed of "1.0", and a lower horizontal line represents a rotation speed of "−1.0". "−" means that rotational elements is rotated in an opposite direction of a rotational direction of the engine. It is because the rotation elements are externally meshed with each other through the first, second, and third transfer gears TF1, TF2, and TF3 without an idling gear.

In addition, the rotation speed of "1.0" represents the same rotational speed as the first shaft IS1 which is an input shaft. Distances between the vertical lines of the first, second, and third planetary gear sets PG1, PG2, and PG3 are set according to each gear ratio (teeth number of a sun gear/teeth number of a ring gear).

Hereinafter, referring to FIG. 2 and FIG. 3A to FIG. 3I, the shift processes of the planetary gear train according to various embodiments of the present invention will be described in detail.

First Forward Speed.

Figure 3A:
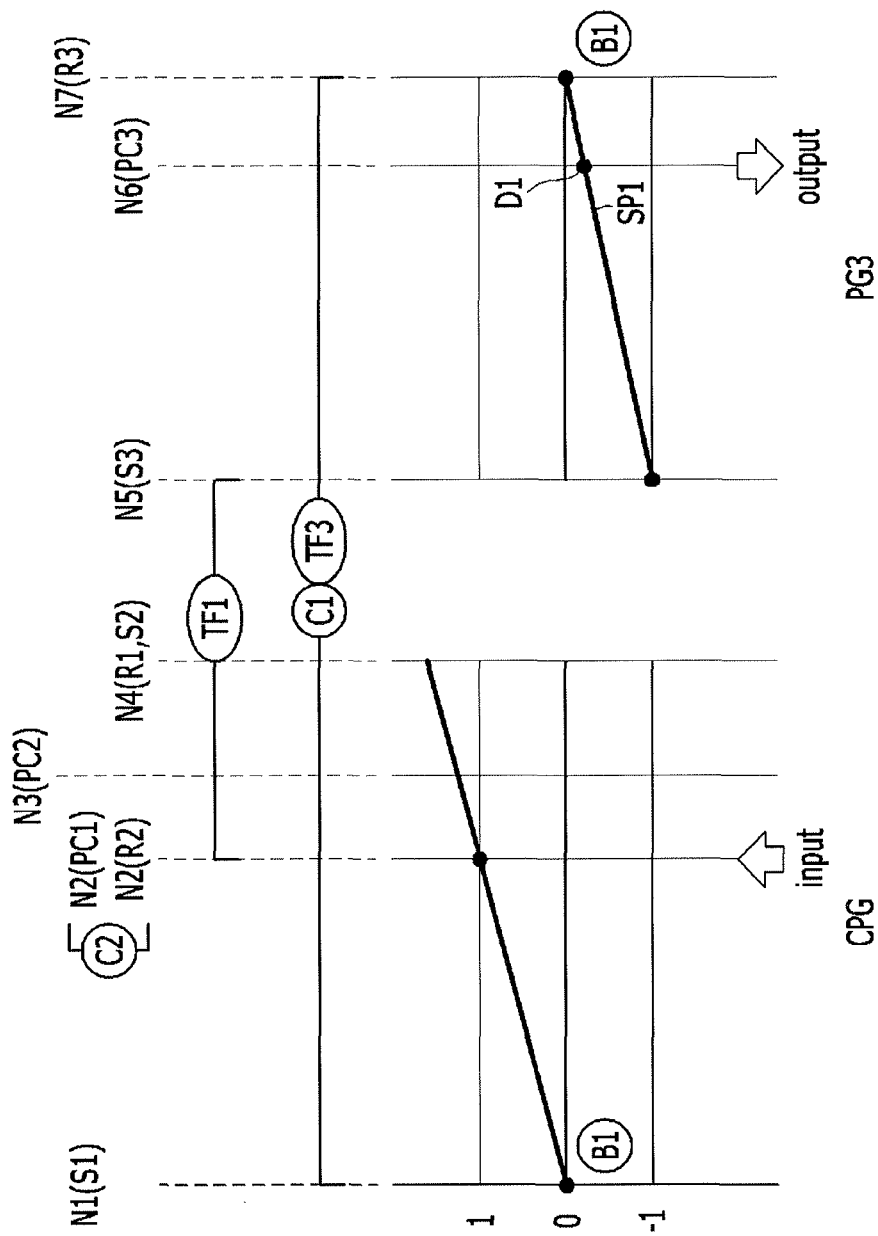
FIG. 3A is a lever diagram of an exemplary planetary gear train at the first forward speed according to the present invention.

Referring to FIG. 2, the first and second clutches C1 and C2 and the first brake B1 are operated at the first forward speed 1ST. As shown in FIG. 3A, the first planet carrier PC1 and the second ring gear R2 are connected by operation of the second clutch C2 so as to form the second rotation element N2, and the torque of the input shaft IS is input to the second rotation element N2 and is changed according to the gear ratio of the first transfer gear TF1 and is then input to the fifth rotation element N5 as inverse rotation speed.

At this state, the first rotation element N1 and the seventh rotation element N7 are operated as fixed elements by operation of the first brake B1 and the first clutch C1. Therefore, the rotation elements of the third planetary gear set PG3 form a first shift line SP1 and D1 is output through the sixth rotation element N6 that is the output element.

Second Forward Speed.

Figure 3B:
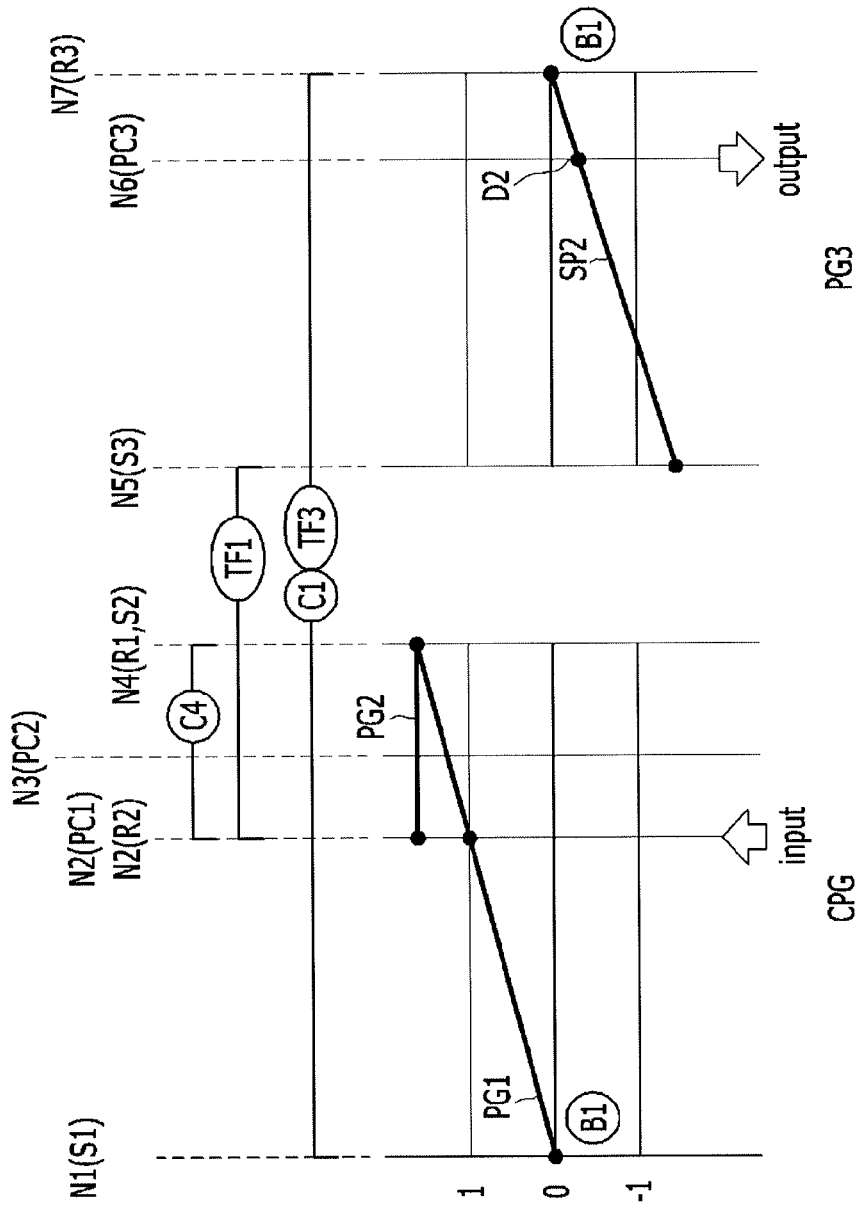
FIG. 3B is a lever diagram of an exemplary planetary gear train at the second forward speed according to the present invention.

The second clutch C2 that was operated at the first forward speed 1ST is released and the fourth clutch C4 is operated at the second forward speed 2ND. As shown in FIG. 3B, the second clutch C2 is released and the first planet carrier PC1 and the second ring gear R2 are disconnected. At this time, the torque of the input shaft IS is input to the second rotation element N2 formed by the first planet carrier PC1.

At this state, the first sun gear S1 being the first rotation element N1 is operated as the fixed element by operation of the first brake B1 and an increased rotation speed is output through the first ring gear R1 being the fourth rotation element N4.

In addition, the second planetary gear set PG2 integrally rotates by operation of the fourth clutch C4. Therefore, the increased rotation speed is changed according to the gear ratio of the first transfer gear TF1 and is then input to the fifth rotation element N5 as inverse rotation speed.

At this state, the first rotation element N1 and the seventh rotation element N7 are operated as the fixed elements by operation of the first brake B1 and the first clutch C1. Therefore, the rotation elements of the third planetary gear set PG3 form a second shift line SP2 and D2 is output through the sixth rotation element N6 that is the output element.

Third Forward Speed.

The first brake B1 that was operated at the second forward speed 2ND is released and the second clutch C2 is operated at the third forward speed 3RD. As shown in FIG. 3C, the compound planetary gear set CPG integrally rotates by operation of the second clutch C2 and the fourth clutch C4.

At this state, the torque of the input shaft IS is input to the second rotation element N2, and is changed according to the gear ratio of the first transfer gear TF1 and is then input to the fifth rotation element N5 as inverse rotation speed.

In addition, the torque of the first rotation element N1 is changed according to the gear ratio of the third transfer gear TF3 and is then input to the seventh rotation element as inverse rotation speed by operation of the first clutch C1.

Therefore, the rotation elements of the third planetary gear set PG3 form a third shift line SP3 and D3 is output through the sixth rotation element N6 that is the output element.

Fourth Forward Speed.

The second clutch C2 that was operated at the third forward speed 3RD is released and the third clutch C3 is operated at the fourth forward speed 4TH. As shown in FIG. 3D, the second clutch C2 is released and the first planet carrier PC1 and the second ring gear R2 are disconnected. At this time, the torque of the input shaft IS is input to the second rotation element N2 formed by the first planet carrier PC1. In addition, the second planetary gear set PG2 integrally rotates by operation of the fourth clutch C4.

At this state, the torque of the first rotation element N1 is changed according to the gear ratio of the third transfer gear TF3 and is then input to the seventh rotation element N7 as inverse rotation speed by operation of the first clutch C1, and the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form a fourth shift line SP4 and D4 is output through the sixth rotation element N6 that is the output element.

Fifth Forward Speed.

Figure 3E:
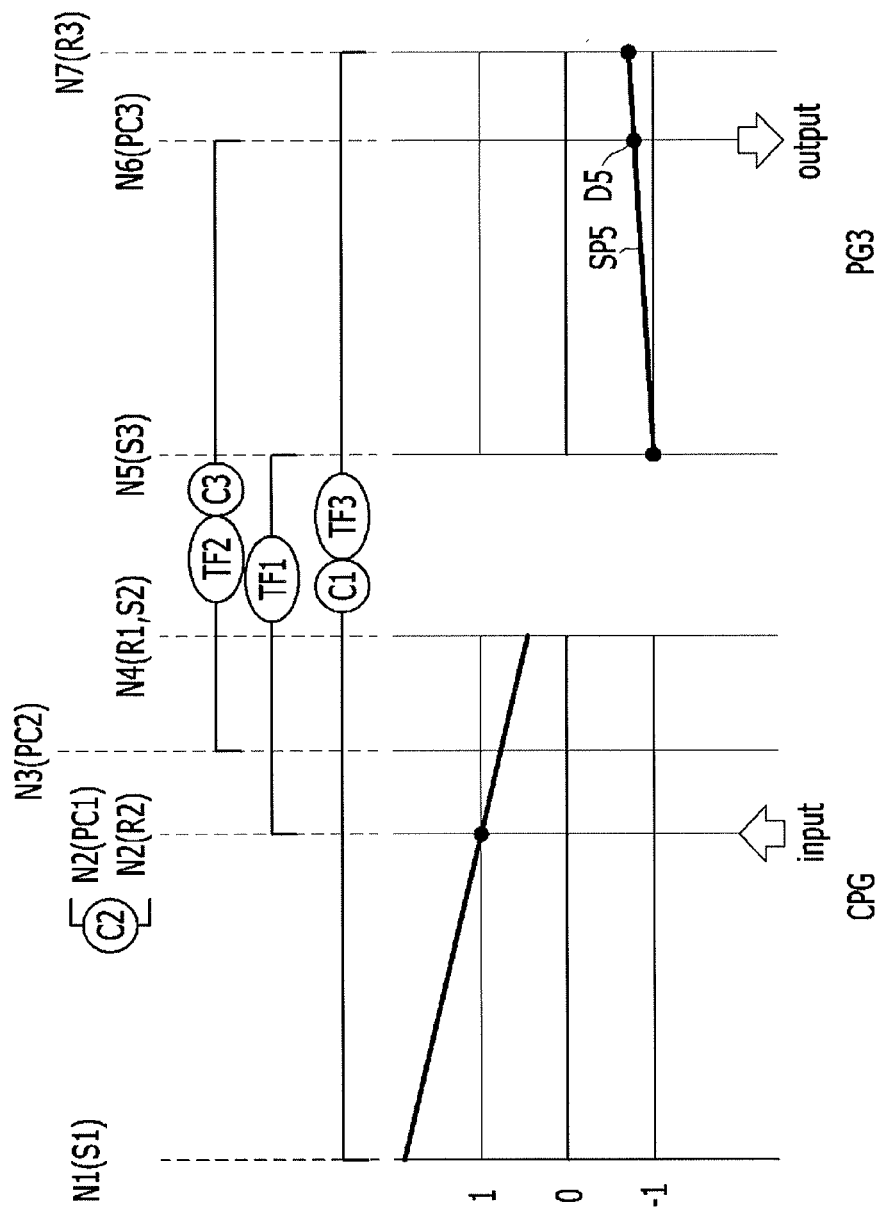
FIG. 3E is a lever diagram of an exemplary planetary gear train at the fifth forward speed according to the present invention.

The fourth clutch C4 that was operated at the fourth forward speed 4TH is released and the second clutch C2 is operated at the fifth forward speed 5TH. As shown in FIG. 3E, the first planet carrier PC1 and the second ring gear R2 are connected by operation of the second clutch C2 so as to form the second rotation element N2. The torque of the input shaft IS is input to the second rotation element N2 and is changed according to the gear ratio of the first transfer gear TF1 and is then input to the fifth rotation element N5 as inverse rotation speed.

In addition, the torque of the first rotation element N1 is changed according to the gear ratio of the third transfer gear TF3 and is then input to the seventh rotation element N7 as inverse rotation speed by operation of the first clutch C1, and the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form a fifth shift line SP5 and D5 is output through the sixth rotation element N6 that is the output element.

Sixth Forward Speed.

The first clutch C1 that was operated at the fifth forward speed 5TH is released and the fourth clutch C4 is operated at the sixth forward speed 6TH. As shown in FIG. 3F, the compound planetary gear set CPG integrally rotates by operation of the second clutch C2 and the fourth clutch C4.

At this state, the torque of the input shaft IS is input to the second rotation element N2, and is changed according to the gear ratio of the first transfer gear TF1 and is then input to the fifth rotation element N5 as inverse rotation speed.

In addition, the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form a sixth shift line SP6 and D6 is output through the sixth rotation element N6 that is the output element.

Seventh Forward Speed.

Figure 3G:
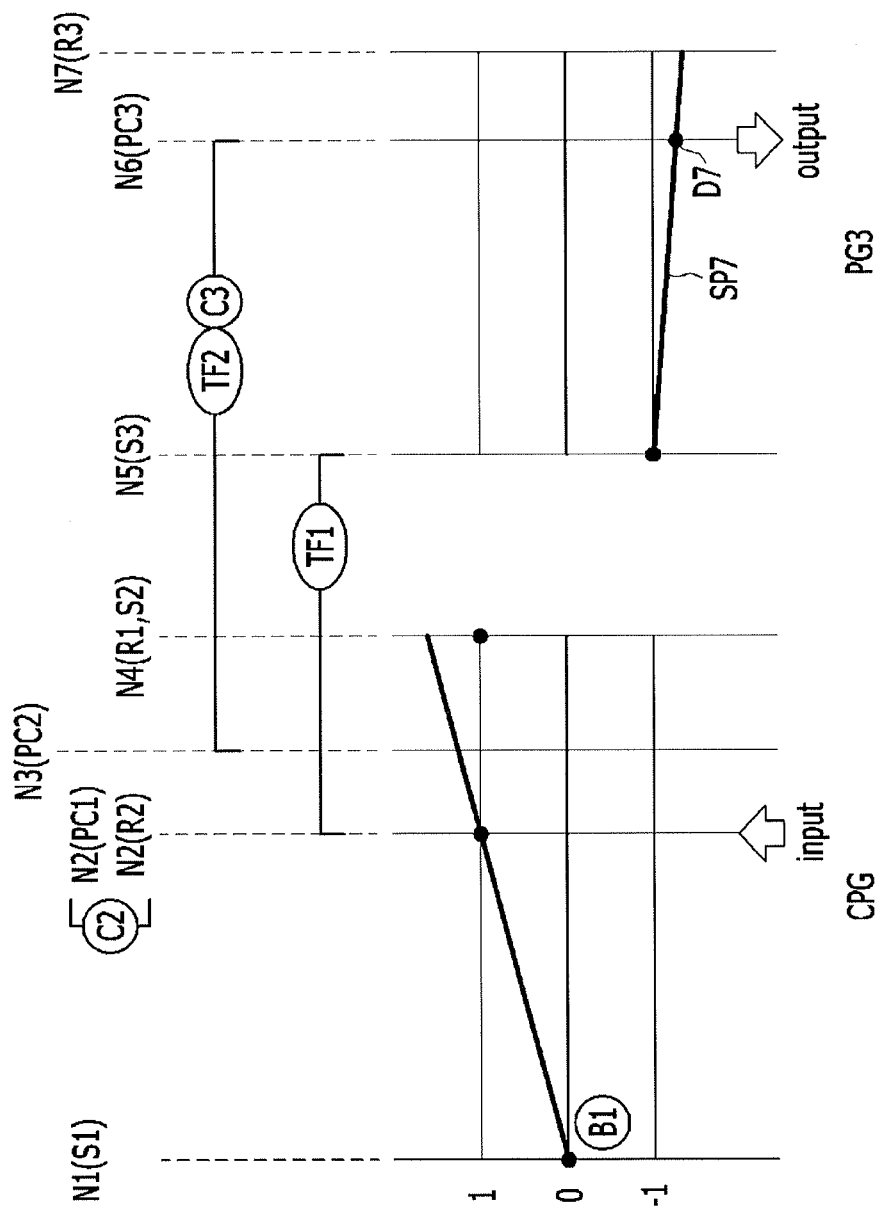
FIG. 3G is a lever diagram of an exemplary planetary gear train at the seventh forward speed according to the present invention.

The fourth clutch C4 that was operated at the sixth forward speed 6TH is released and the first brake B1 is operated at the seventh forward speed 7TH. As shown in FIG. 3G, the first planet carrier PC1 and the second ring gear R2 are connected by operation of the second clutch C2 so as to form the second rotation element N2. The torque of the input shaft IS is input to the second rotation element N2 and is changed according to the gear ratio of the first transfer gear TF1 and is then input to the fifth rotation element N5 as inverse rotation speed, and the first rotation element N1 is operated as the fixed element by operation of the first brake B1.

In addition, the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form a seventh shift line SP7 and D7 is output through the sixth rotation element N6 that is the output element.

Eighth Forward Speed.

Figure 3H:
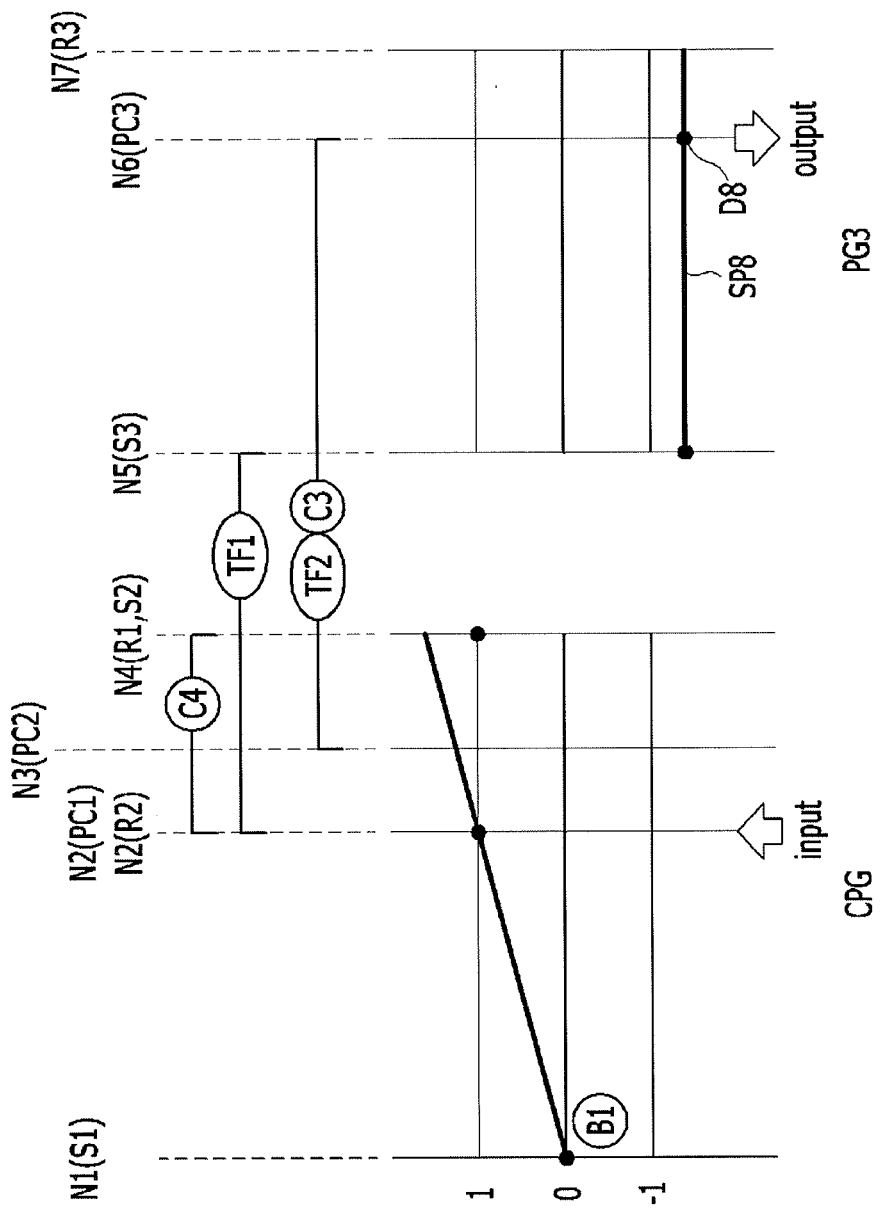
FIG. 3H is a lever diagram of an exemplary planetary gear train at the eighth forward speed according to the present invention.

The second clutch C2 that was operated at the seventh forward speed 7TH is released and the third clutch C3 is operated at the eighth forward speed 8TH. As shown in FIG. 3H, the second clutch C2 is released and the first planet carrier PC1 and the second ring gear R2 are disconnected. At this time, the torque of the input shaft IS is input to the second rotation element N2 formed by the first planet carrier PC1.

At this state, the first sun gear S1 being the first rotation element N1 is operated as the fixed element by operation of the first brake B1 and the increased rotation speed is output through the first ring gear R1 being the fourth rotation element N4.

In addition, the second planetary gear set PG2 integrally rotates by operation of the fourth clutch C4. Therefore, the increased rotation speed is changed according to the gear ratio of the first transfer gear TF1 and is then input to the fifth rotation element N5 as inverse rotation speed, and the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form an eighth shift line SP8 and D8 is output through the sixth rotation element N6 that is the output element.

Reverse Speed.

Figure 3I:
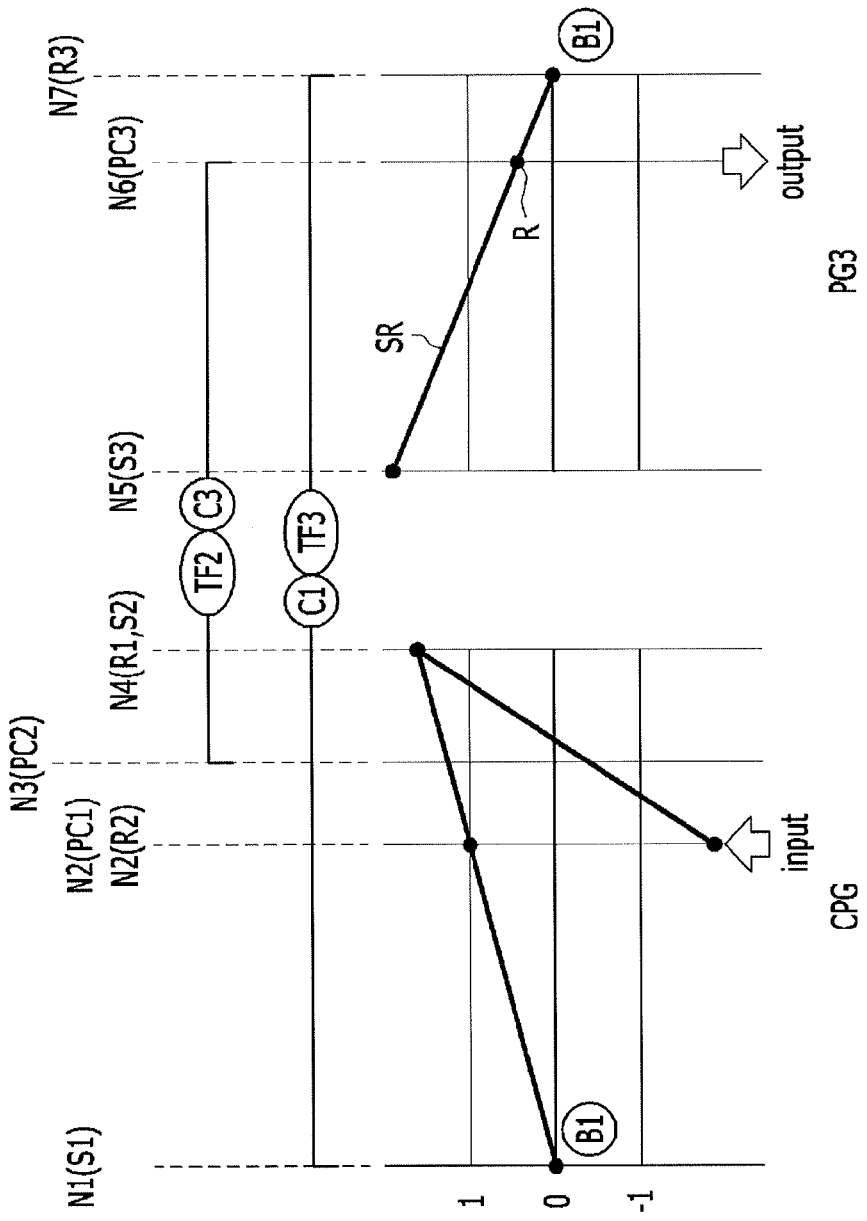
FIG. 3I is a lever diagram of an exemplary planetary gear train at a reverse speed according to the present invention.

As shown in FIG. 2, the first brake B1 and the first and third clutches C1 and C3 are operated at the reverse speed REV. As shown in FIG. 3I, in a state that the torque of the input shaft IS is input to the second rotation element N2 being the first planet carrier PC1 and the first rotation element N1 and the seventh rotation element N7 are operated as the fixed elements by operation of the first brake B1 and the first clutch C1.

In addition, the torque of the third rotation element N3 is changed according to the gear ratio of the second transfer gear TF2 and is then input to the sixth rotation element N6 as inverse rotation speed by operation of the third clutch C3.

Therefore, the rotation elements of the third planetary gear set PG3 form a reverse shift line RS and REV is output through the sixth rotation element N6 that is the output element.

Since three planetary gear sets are separately disposed on the input shaft and the output shaft disposed apart from and in parallel or substantially in parallel with each other in the planetary gear train according to various embodiments of the present invention, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency. In addition, since torque load of each frictional element can be reduced, compact design is possible.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque of an engine;
   an output shaft disposed in parallel with the input shaft;
   a first planetary gear set including a first sun gear, a first planet carrier, and a first ring gear as rotation elements thereof;
   a second planetary gear set including a second sun gear, a second planet carrier, and a second ring gear as rotation elements thereof; and
   a third planetary gear set including a third sun gear, a third planet carrier, and a third ring gear as rotation elements thereof; wherein
   a first rotation element being one rotation element of the first planetary gear set and selectively connected to a transmission housing;
   a second rotation element being another rotation element of the first planetary gear set, directly connected to the input shaft, and selectively connected to one rotation element of the second planetary gear set;
   a third rotation element being another rotation element of the second planetary gear set;
   a fourth rotation element being a remaining rotation element of the first planetary gear set and a remaining rotation element of the second planetary gear set directly connected to each other;
   a fifth rotation element being one rotation element of the third planetary gear set, connected to the one rotation element of the second planetary gear set through a first transfer gear, and selectively connected to the input shaft through the first transfer gear;
   a sixth rotation element being another rotation element of the third planetary gear set, directly connected to the output shaft, and selectively connected to the third rotation element through a second transfer gear; and a seventh rotation element being a remaining rotation element of the third planetary gear set and selectively connected to the first rotation element through a third transfer gear.

2. The planetary gear train of claim 1, wherein each of the first, second, and third planetary gear sets is a single pinion planetary gear set.

3. The planetary gear train of claim 1, wherein:
the first rotation element is the first sun gear,
the second rotation element is the first planet carrier,
the third rotation element is the second planet carrier,
the fourth rotation element is the first ring gear and the second sun gear,
the fifth rotation element is the third sun gear,
the sixth rotation element is the third planet carrier, and
the seventh rotation element is the third ring gear.

4. The planetary gear train of claim 1, further comprising:
a first clutch disposed between the first rotation element and the third transfer gear;
a second clutch disposed between the input shaft and the first transfer gear;
a third clutch disposed between the sixth rotation element and the second transfer gear;
a fourth clutch operable to integrally rotate the second planetary gear set; and
a first brake disposed between the first rotation element and the transmission housing.

5. The planetary gear train of claim 4, wherein:
the first and second clutches and the first brake are operated at a first forward speed,
the first and fourth clutches and the first brake are operated at a second forward speed,
the first, second, and fourth clutches are operated at a third forward speed,
the first, third, and fourth clutches are operated at a fourth forward speed,
the first, second, and third clutches are operated at a fifth forward speed,
the second, third, and fourth clutches are operated at a sixth forward speed,
the second and third clutches and the first brake are operated at a seventh forward speed,
the third and fourth clutches and the first brake are operated at an eighth forward speed, and
the first and third clutches and the first brake are operated at a reverse speed.

6. A planetary gear train of an automatic transmission for a vehicle comprising:
an input shaft receiving torque of an engine;
an output shaft disposed in parallel with the input shaft;
a first planetary gear set including a first sun gear, a first planet carrier, and a first ring gear as rotation elements thereof;
a second planetary gear set including a second sun gear, a second planet carrier, and a second ring gear as rotation elements thereof; and
a third planetary gear set including a third sun gear, a third planet carrier, and a third ring gear as rotation elements thereof; wherein
a first rotation element being the first sun gear and selectively connected to a transmission housing;
a second rotation element being the first planet carrier and selectively connected to the second ring gear and directly connected to the input shaft;
a third rotation element being the second planet carrier;
a fourth rotation element being the first ring gear and the first sun gear directly connected to each other and selectively connected to the second ring gear;
a fifth rotation element being the third sun gear, selectively connected to the input shaft through a first transfer gear, and connected to the second ring gear through the first transfer gear;
a sixth rotation element being the third planet carrier, directly connected to the output shaft, and selectively connected to the third rotation element through a second transfer gear; and
a seventh rotation element being the third ring gear and selectively connected to the first rotation element through a third transfer gear.

7. The planetary gear train of claim 6, wherein each of the first, second, and third planetary gear sets is a single pinion planetary gear set.

8. The planetary gear train of claim 6, further comprising:
a first clutch disposed between the first rotation element and the third transfer gear;
a second clutch disposed between the input shaft and the first transfer gear;
a third clutch disposed between the sixth rotation element and the second transfer gear;
a fourth clutch operable to integrally rotate the second planetary gear set; and
a first brake disposed between the first rotation element and the transmission housing.

9. The planetary gear train of claim 8, wherein:
the first and second clutches and the first brake are operated at a first forward speed,
the first and fourth clutches and the first brake are operated at a second forward speed,
the first, second, and fourth clutches are operated at a third forward speed,
the first, third, and fourth clutches are operated at a fourth forward speed,
the first, second, and third clutches are operated at a fifth forward speed,
the second, third, and fourth clutches are operated at a sixth forward speed,
the second and third clutches and the first brake are operated at a seventh forward speed,
the third and fourth clutches and the first brake are operated at an eighth forward speed, and
the first and third clutches and the first brake are operated at a reverse speed.

* * * * *